United States Patent
Regev et al.

(10) Patent No.: US 6,636,932 B1
(45) Date of Patent: Oct. 21, 2003

(54) CROSSBAR SWITCH AND CONTROL FOR DATA NETWORKS SWITCHING

(75) Inventors: Zvi Regev, Woodland Hills, CA (US); Alon Regev, Woodland Hills, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/320,908

(22) Filed: May 27, 1999

Related U.S. Application Data (60) Provisional application No. 60/086,903, filed on May 27, 1998.

(51) Int. Cl.[7] .......................... G06F 13/00; G01R 31/08
(52) U.S. Cl. ........................ 710/317; 710/316; 370/250
(58) Field of Search ................. 710/316, 317; 370/350–362

(56) References Cited

U.S. PATENT DOCUMENTS

| | | | |
|---|---|---|---|
| 4,696,000 A | 9/1987 | Payne, III | |
| 4,752,777 A | 6/1988 | Franaszek | |
| 4,754,451 A | 6/1988 | Eng et al. | |
| 4,797,880 A | 1/1989 | Bussey et al. | |
| 4,845,722 A | 7/1989 | Kent et al. | |
| 4,866,701 A | 9/1989 | Giacopelli et al. | |
| 4,899,334 A | 2/1990 | Shimizu | |
| 4,970,507 A | 11/1990 | Cooperman et al. | |
| 5,023,590 A * | 6/1991 | Johnson et al. | 340/146.2 |
| 5,088,091 A | 2/1992 | Schroeder et al. | |
| 5,166,927 A | 11/1992 | Lida et al. | |
| 5,179,552 A | 1/1993 | Chao et al. | |
| 5,179,558 A | 1/1993 | Thacker et al. | |
| 5,377,182 A | 12/1994 | Monacos | |
| 5,724,352 A * | 3/1998 | Cloonan et al. | 370/395 |
| 5,794,062 A * | 8/1998 | Baxter | 710/317 |
| 6,009,531 A * | 12/1999 | Selvidge et al. | 713/400 |
| 6,208,667 B1 * | 3/2001 | Caldara et al. | 370/503 |

* cited by examiner

Primary Examiner—Tim Vo
(74) Attorney, Agent, or Firm—Dickstein Shapiro Morin & Oshinsky LLP (57) ABSTRACT

A modified version of a switching/routing device commonly known as a crossbar switch which is optimized to switch and reroute very high speed synchronous data communication signals without interruptions and/or excessive transition time shifts.

9 Claims, 11 Drawing Sheets

CROSSBAR SWITCH AND CONTROL FOR DATA NETWORKS SWITCHING

The present application is a non-provisional application of provisional application Ser. No. 60/086,903, filed May 27, 1998.

BACKGROUND OF THE INVENTION

In data networks, signals are normally transmitted in an encoded format and receivers use Phase Locked Loops (PLL) to recover the clocks and data from the received signals. In network communication systems, data is transmitted in packets of different formats, with certain gaps between the packets. If special precautions are not taken, every time a packet ends the Phase Locked Loops on that network go out of lock. A significant length of time will elapse before the phase-lock is reacquired. Such gaps in data transmission greatly increase the latency through the system, and reduce the system capability of transferring certain types of data streams such as Digital Video signals. To guarantee that the PLLs are kept in the phase-locked state and all times, an IDLE signal is transmitted between data packets which keep these phase locked loops in the desired locked state. However, when a signal path through a crossbar switch is changed, so does the propagation delay through the path in the device which results in a phase shift in the signal transferred, and possibly the loss of lock at the PLL at the remote end of the line. This issue becomes a problem when signals with a high rate of speed are routed using devices like crossbar switches. Differences in propagation delays between different paths may cause PLLs in the remote receivers to go out of lock. This invention deals with the time/phase shift problem and solves it by adding flip-flops in the data path which re-time the data and tie the data transitions to a stable master clock. This invention also deals with a different aspect of phase shifts and synchronization problems which are associated with routing signals using crossbar type switches, namely a problem caused by the disconnecting and reconnecting of signals when routes are changed. This invention describes a switching device wherein changes in the data paths do not cause phase shifts in the data outputs.

DESCRIPTION OF THE PRIOR ART

Prior art crossbar switches are usually made as general purpose switching devices without any specific circuitry expressly designed to deal with phase shifts and synchronization issues.

BRIEF SUMMARY OF THE INVENTION

In prior art crossbar switch applications, the prevailing assumption was that propagation delay variations in different paths in the crossbar switch can be minimized, and no further processing at the crossbar switch level is required to prevent errors in the signals passed through the switch due to such delay variations. As the bandwidths of the signals which are routed through such devices increases, such assumption is no longer valid. A 100 ps delay change equals a 36 degree phase change in a 1 GHz signal frequency. This invention solves the delay variation problems by adding two mechanisms that when combined can eliminate the delay variations all together. To prevent such phase changes from being propagated beyond the boundaries of the crossbar switch, each output is equipped with a high-speed flip-flop. These flip-flops are clocked by a stable master clock. As the timing of data at the output of flip-flops depends on the timing of the clock to such flip-flops, placing flip-flops at the outputs of a crossbar switch, guarantees that data transitions at the outputs of these flip-flops is not affected by any data delay changes at the inputs to the said flip-flops. To ensure the proper timing between the data and the clock at the inputs to the flip-flops, a programmable delay device is inserted in each signal path through the switch. The lookup tables are addressed by the same control signals which are used to select a path through the crossbar switch and thus provide a different output code for different paths. Such programmable delay may be inserted in front of the crossbar switch or between the switch and the flip-flops. The control of the variable delay may be achieved either by an analog or digital delay locked loop, or by a lookup table. The programmable delay devices are programmed such that the amount of delay added in the signal path by the programmable device, will bring the transitions in the signal to within a small time window with regards to a known reference, regardless of the path through which the signal is passed. To further minimize delay variations and phase shifts they cause, each signal path is equipped with a very fast edge triggered flip-flop to re-clock and re-time the signal in the path. A stable clock at a rate appropriate for the signals in the path is used to clock the flip-flops, and provide a stable phase reference. A different aspect of the signal integrity relates to the changes in routes through the crossbar switch. The same rules of keeping PLLs on the remote ends in the "Locked" state at all times, should apply also when signal routes through the switch are altered. This invention deals with this issue in the form of a controller that configures the crossbar interconnections in a way that guarantees continuous phase lock in remote receivers.

The invention enables the implementation of a crossbar type switch in which synchronous serial data may be switched and rerouted without interruption and with minimal or no timing variations at the outputs of the switching device.

DETAILED DESCRIPTION OF THE INVENTION

Figure 1:
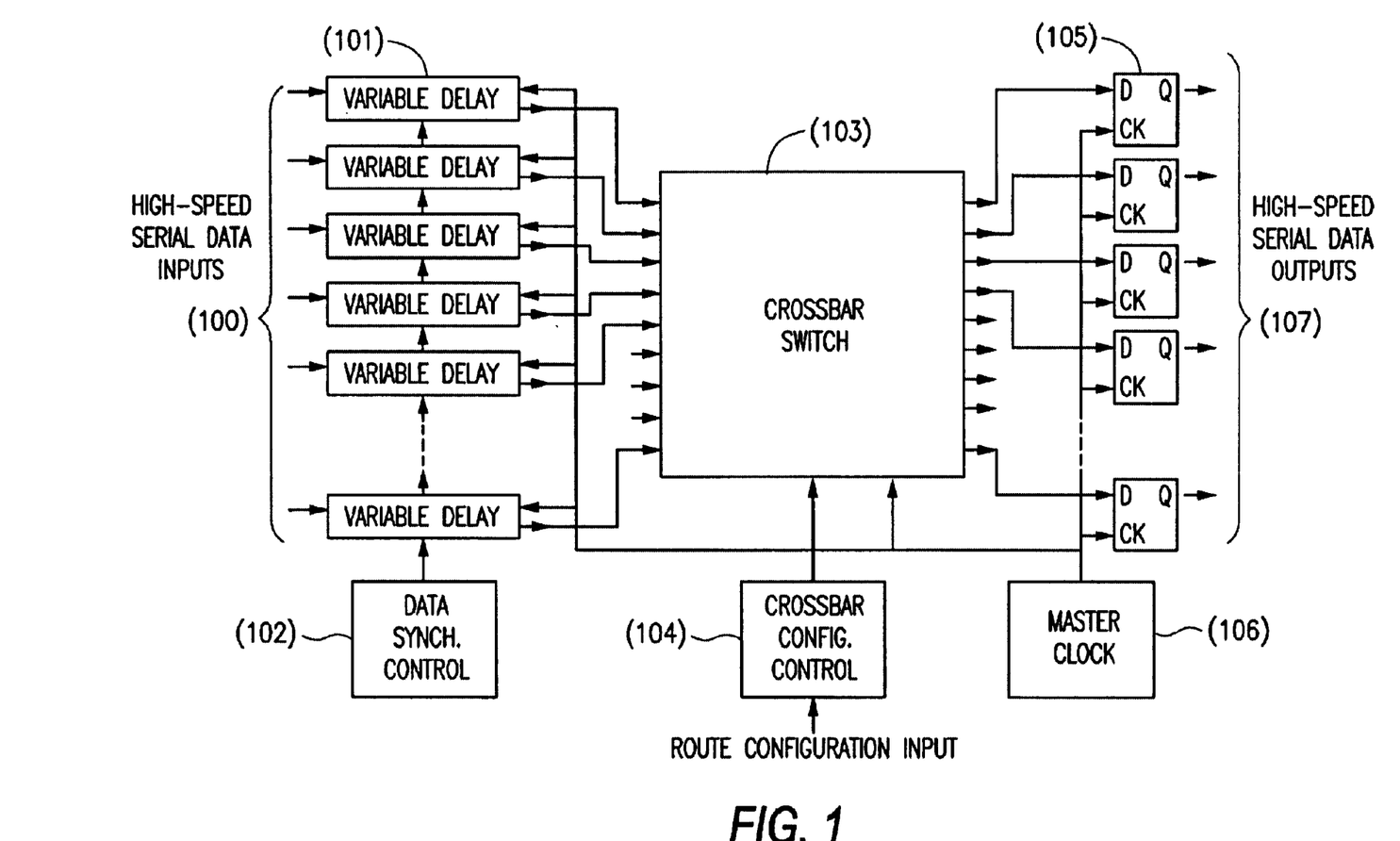
FIG. 1 shows the basic concept of a crossbar switch modified with flip-flops at its outputs, and wherein a variable delay is placed on every data path to synchronize the transition timing of the data with the clock transition timing at the device output flip-flops.
Figure 2:
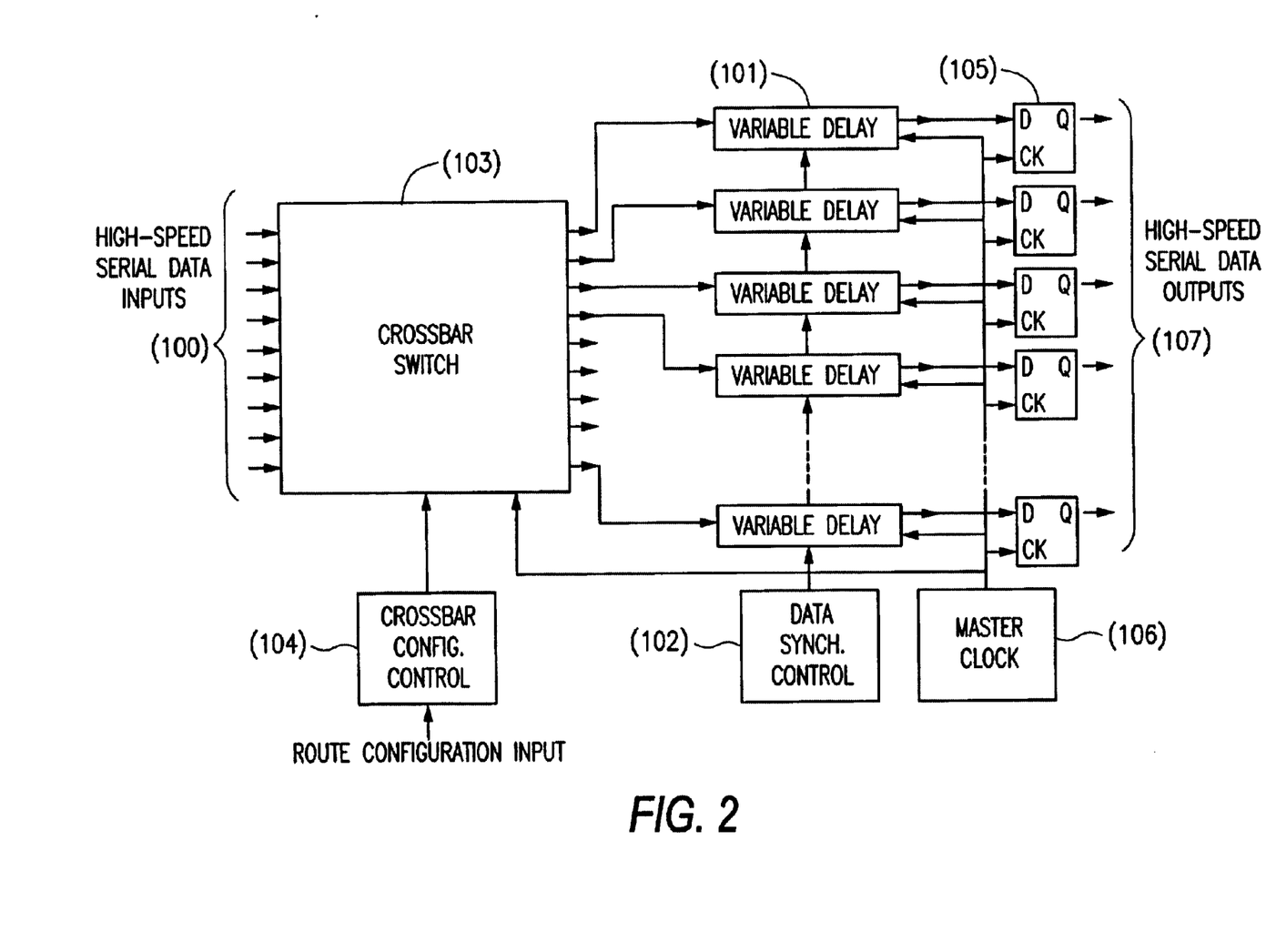
FIG. 2 shows a concept similar to that of FIG. 1 except that the variable delay is placed between the switching device and the output flip-flops.
Figure 3:
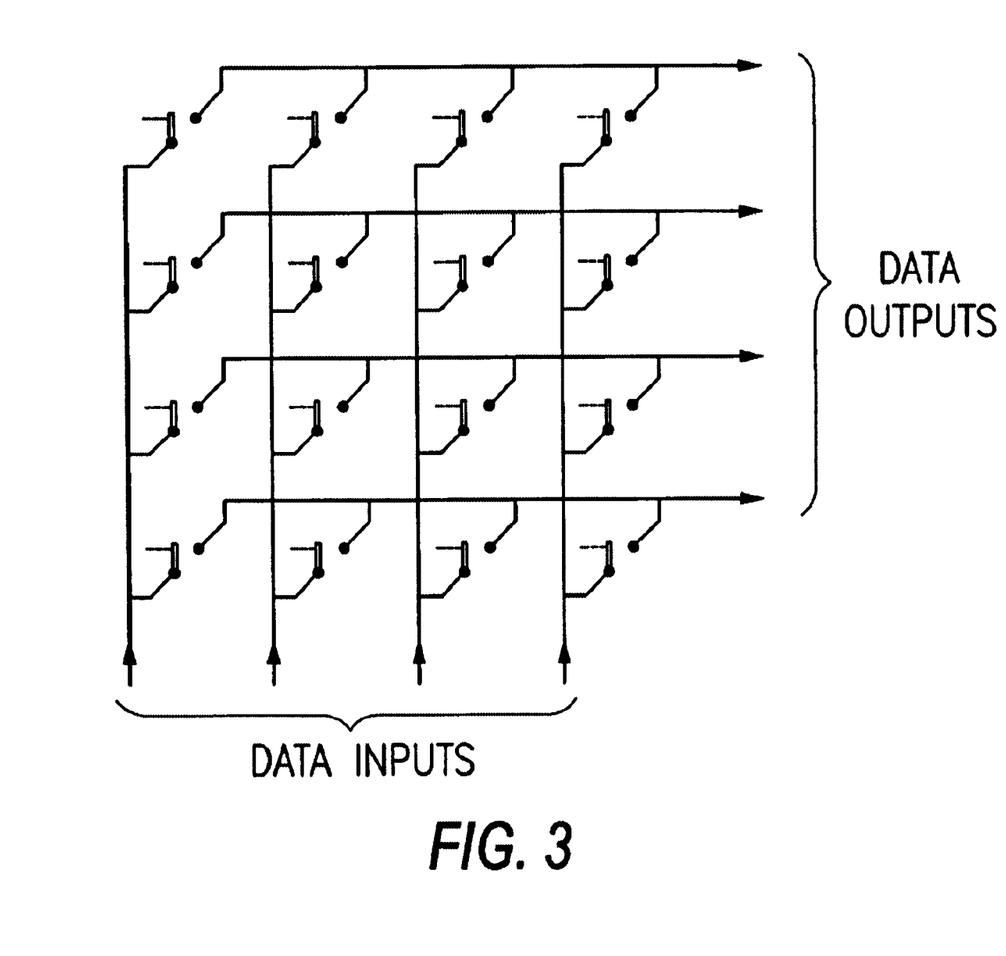
FIG. 3 shows the basic crossbar switch operation as known in the prior art.
Figure 4:
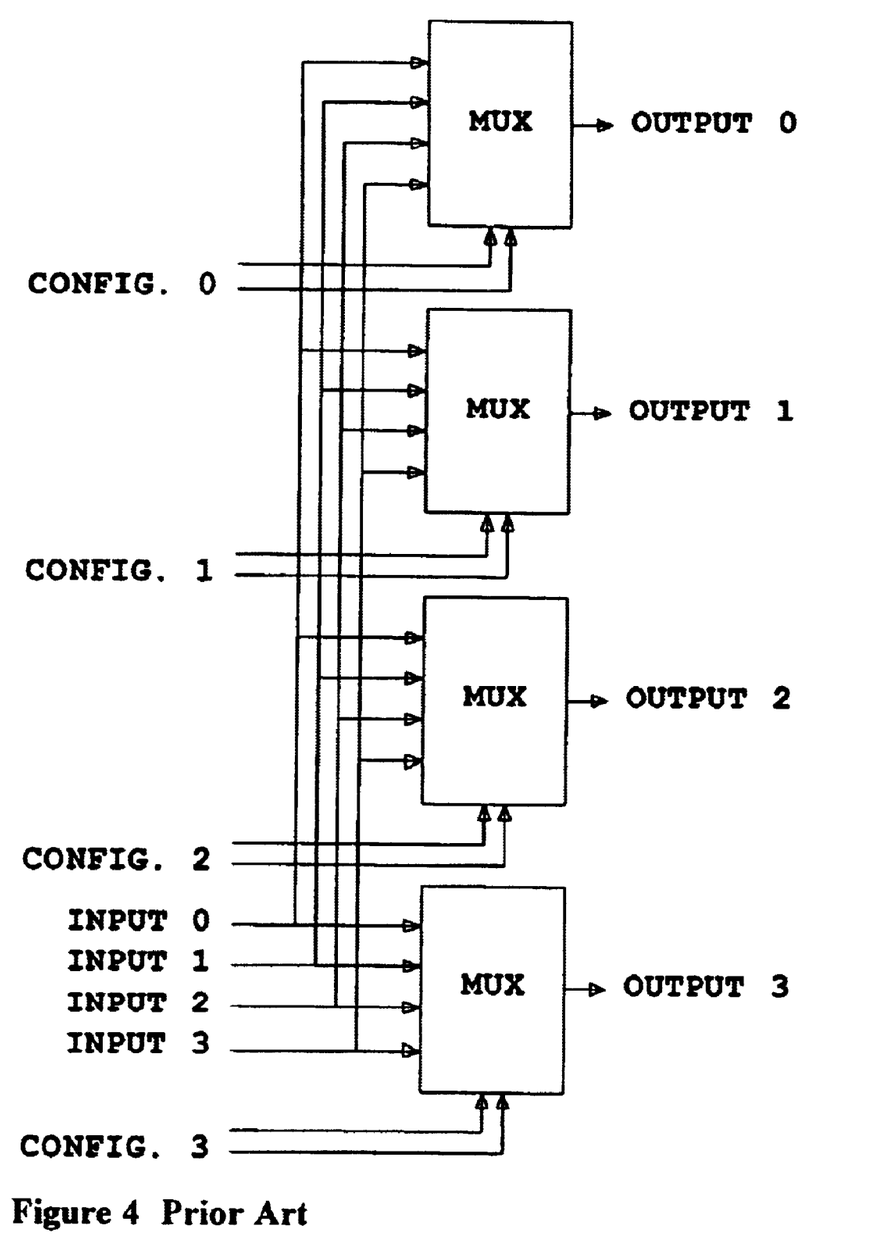
FIG. 4 shows an implementation of a crossbar switch utilizing multiplexers known in the prior art.
Figure 5:
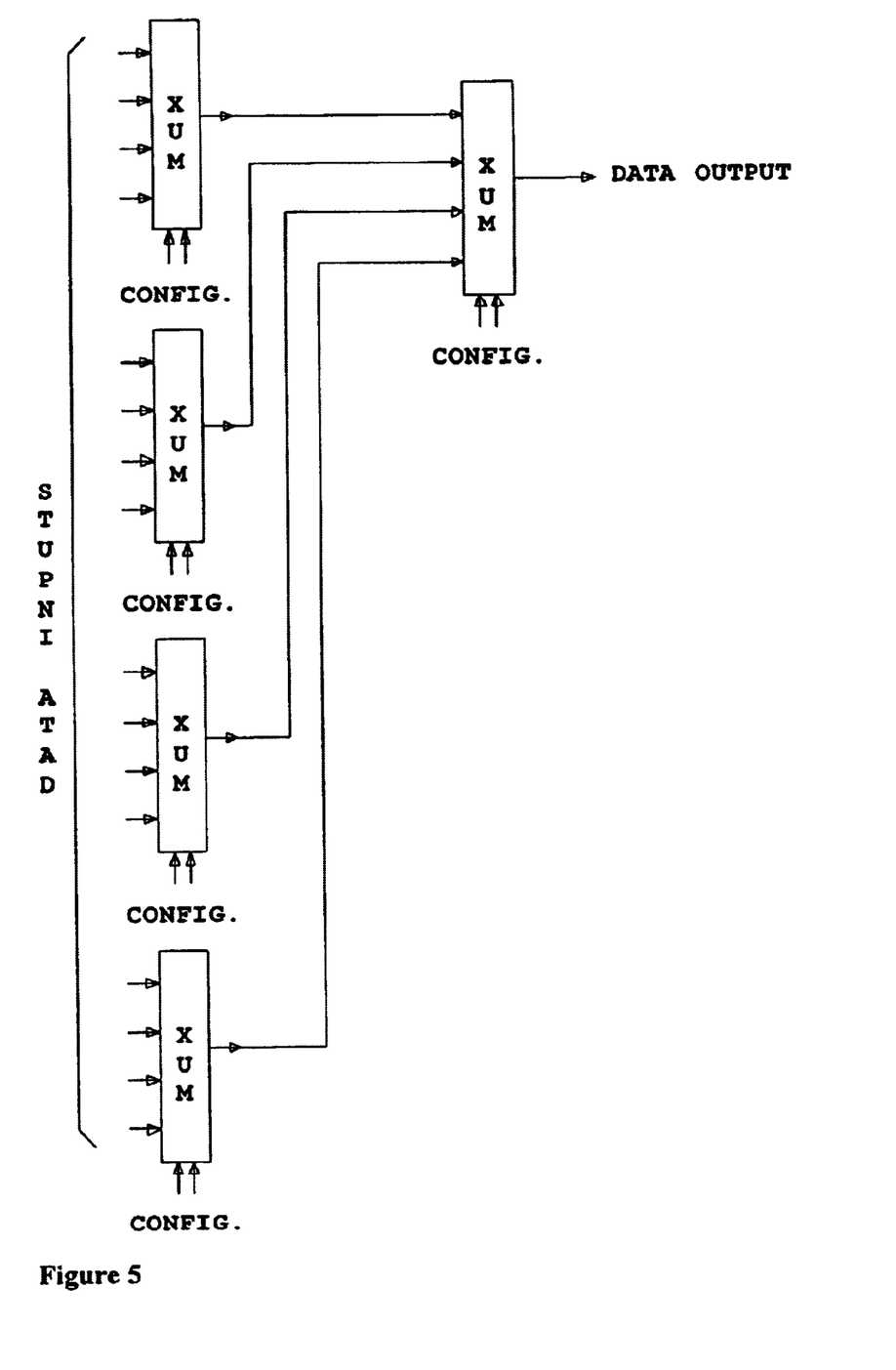
FIG. 5 show the implementation of a multiplexer with a large number of selected inputs utilizing several smaller multiplexers.
Figure 6:
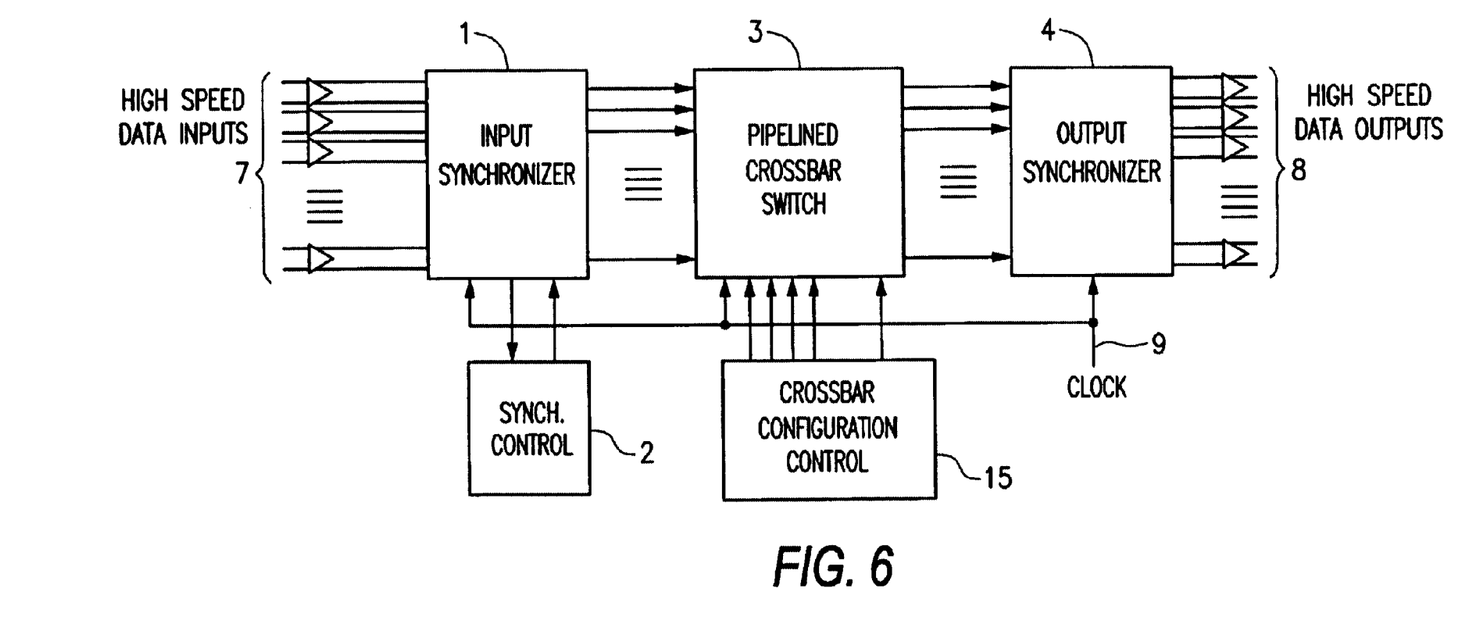
FIG. 6 is a block diagram of one embodiment of the invention.
Figure 7:
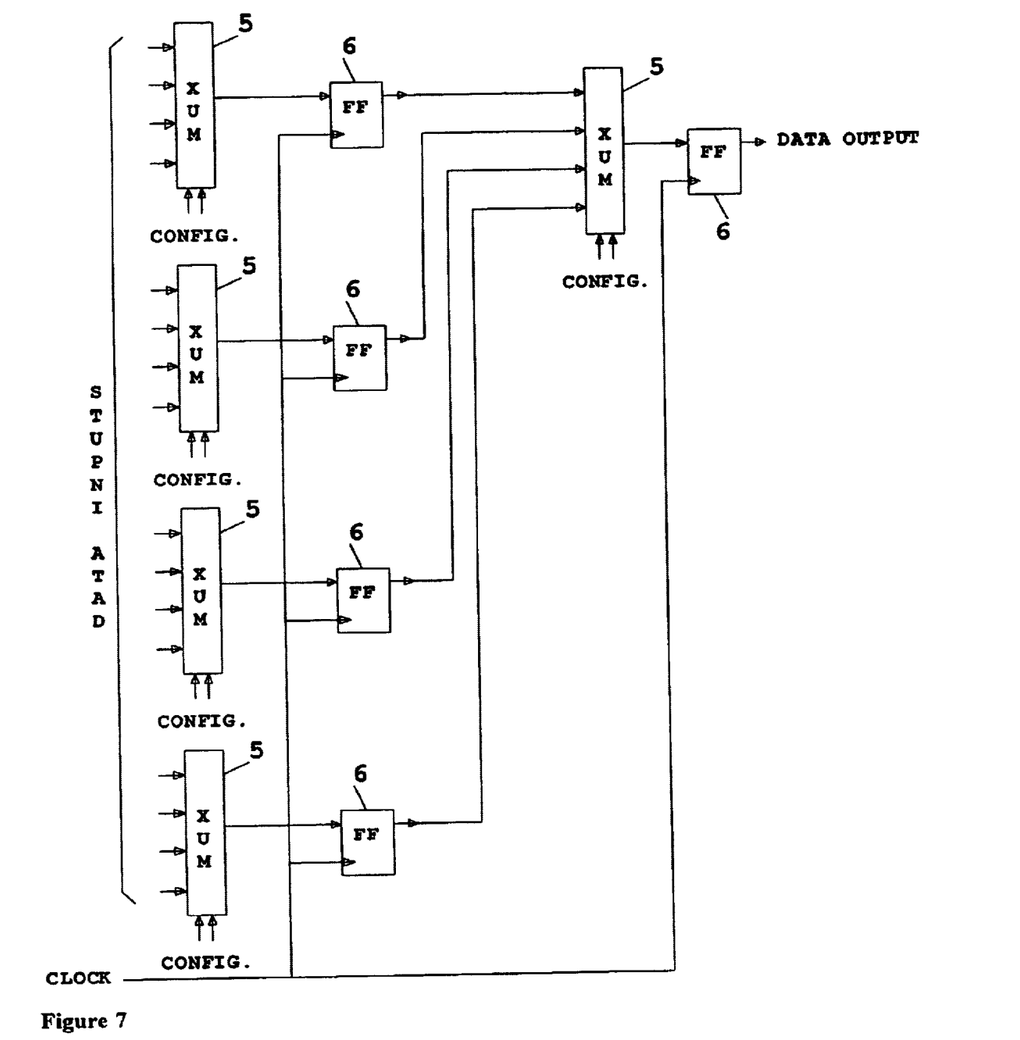
FIG. 7 shows the multiplexer with re-timing flip-flops between the stages of the distributed multiplexer.

FIGS. 1 and 6 are block diagrams which present the basic conceptual switch design of one embodiment of a crossbar switch utilizing the invention. The purpose of the crossbar switch is to provide a mechanism to switch and route serial data at a high rate of speed between inputs and outputs. The serial data is generated in several separate locations, but follows certain common specifications, and is delivered at precisely the same rate as the master clock of the switch. In FIGS. 1 and 2 a set of flip-flops (105) is placed at the output of the crossbar switch (103). All the flip-flops in the set are clocked by a clock signal generated by the master clock circuit (106). Since the clock to each flip-flop is fixed and stable, the high speed data at the outputs (107) of these flip-flops is phase stable independently of the inputs to these flip-flops. The data at the inputs to these flip-flops originates at various high-speed inputs (100), and traverses different routes through the crossbar switch (103). As a result, the precise timing (phase) of the data at the inputs to the flip-flops (105) may vary depending on the originating source and the path through the crossbar switch (103). The basic crossbar structure was developed years ago and is depicted in FIG. 3. Prior art Crossbar switches generally consists of a set of multiplexers as shown in FIG. 4. Since the physical line lengths for different paths through the switch are usually not equal, the propagation delay through such switch vary depending on the path used. This is of particular importance when data at a very high rate of speed is routed using such a switch where a few picoseconds of time difference constitute a significant phase shift. Such a problem can be corrected by breaking the large crossbar multiplexers into smaller ones, and placing flip-flops between them as shown in FIG. 7. In this particular example a 16 to 1 multiplexer is divided into two stages, each composed of one or more 4 to 1 multiplexers (5) each followed by a flip-flop (6). All the flip-flops (6) are clocked by the same master clock as the rest of the crossbar switch. In the pipelined multiplexer described here the propagation delay through the 4 to 1 multiplexer stage is significantly smaller than the master clock period, and therefore the timing requirements of data with respect to the clock are relaxed. When this type of pipelined multiplexer is used, the timing of the data at the inputs of the output synchronization flip-flops (105) no longer depends on the data path within the crossbar, and no variable delay (101) is required at this point. The data signal timing at the inputs to the pipelined crossbar still depends on the source of that signal. The variable delays are therefore placed in front of the crossbar switch as shown in FIG. 1.

Typically in crossbar switches utilized in computer data networks switches, every input of the crossbar switch is always connected to an output. Also the data which is routed through the switch is typically a continuous stream of bit patterns with certain special patterns for data messages, and different patterns between the messages, usually referred to as IDLE signals. This continuous stream of data is designed expressly for the purpose of keeping PLLs in the "locked" state between data messages.

Figure 11:
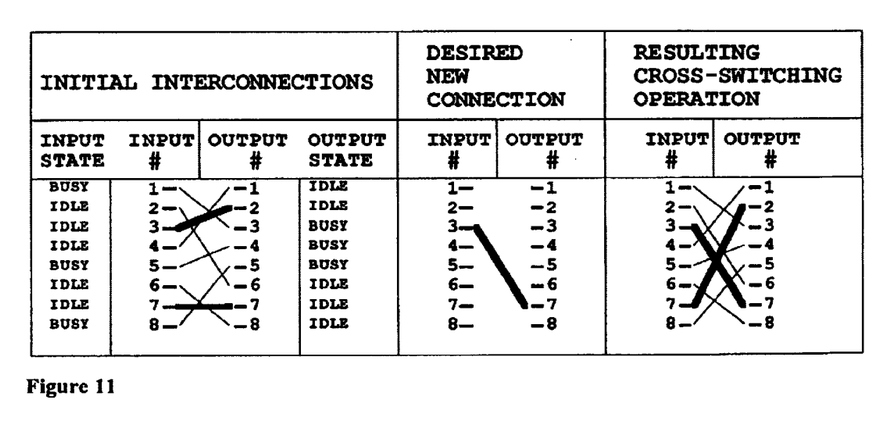
FIG. 11 demonstrates the issue of cross switching.

FIG. 11 shows a typical interconnection situation in an 8×8 crossbar switch. As is shown in the initial state input 1 is connected to output 3 and is busy, input 2 to output 6 and is idle, input 3 to output 2 and is idle, input 4 to output 1 and is idle, etc. Then a request comes to route input 3 to output 7, both ends are idle. Since input 3 is presently connected to output 2 it has to be disconnected from that output. Likewise output 7 presently receives data from input 7 and thus must also be disconnected before input 3 can be connected to output 7. Prior art crossbar switches follow the sequence as above, causing a break in the continuation of the bit pattern stream and a loss of phase-lock at the remote end receivers. Unlike prior art, in the circuit described here, a crossbar configuration control (104) shown in FIG. 2 contains tables of all the interconnections within the crossbar switch (103), and upon a new routing request as shown in FIG. 11 it will automatically and simultaneously perform the following operations: Connect input 3 to output 7, and input 7 to output 2. As described here the crossbar configuration control performs two simultaneous route changes at any given time. Since all inputs and outputs involved are in the idle state, their bit pattern match, and thus these additional connections do not alter the data at the outputs involved. Next the controller (104) disconnects output 2 from input 3, and output 7 from input 7, and an operation referred to below as cross-switching is complete. This cross-switching method along with the other phase maintaining techniques guarantees that remote end PLLs will retain their "locked" status under all conditions. The same mechanism presented her may be employed to simultaneously switch over multiple routes, and thus increase the switching capacity of the switch.

DESCRIPTION OF A PARTICULAR EMBODIMENT

Figure 8:
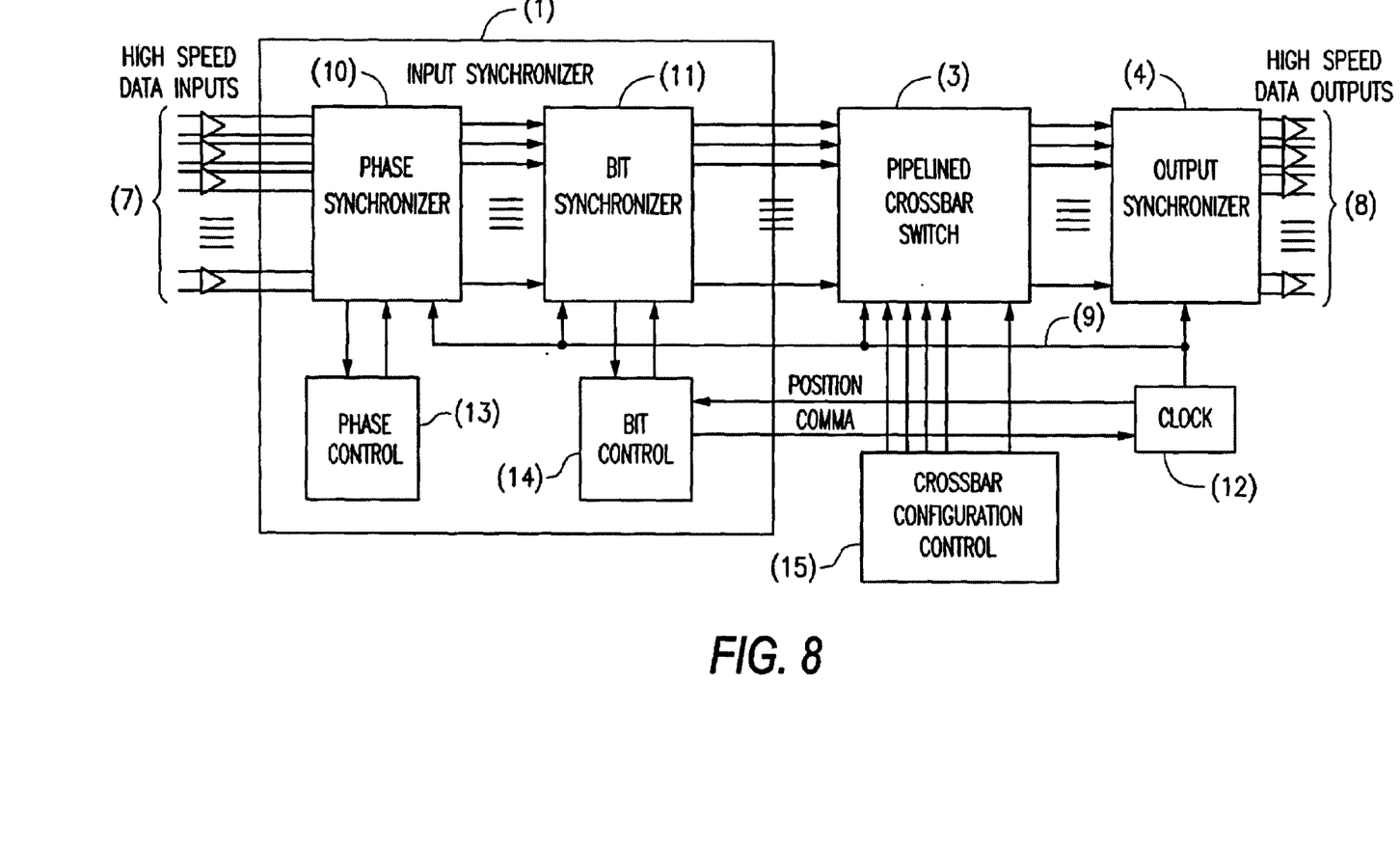
FIG. 8 is a block diagram of a second embodiment of the invention.
Figure 10:
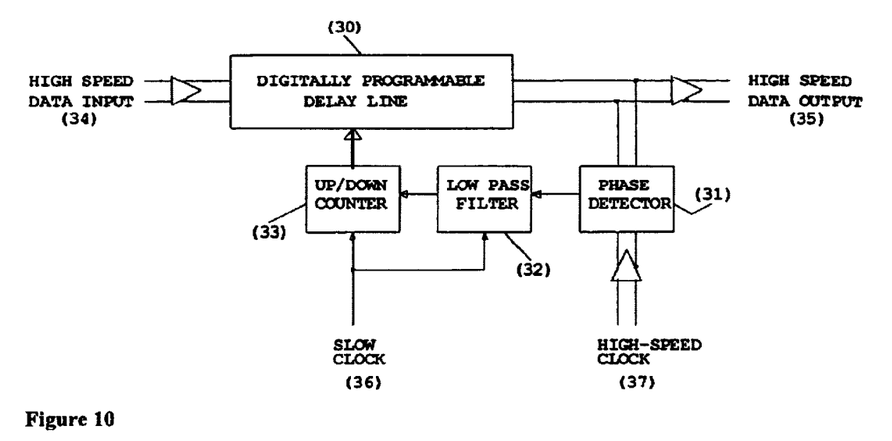
FIG. 10 is a detailed block diagram of a phase synchronization circuit.

A block diagram of a one embodiment for the crossbar switch is shown in FIG. 8. Serial high-speed data (7) enters the input synchronizer (1) which includes two major blocks. First a phase synchronizer (10) aligns the incoming data stream with the internal high-speed clock to insure perfect clock versus data timing in the subsequent flip-flops. FIG. 10 shows the details of the phase synchronizer (10) and its associated phase control (13). The incoming data (34), which corresponds to data (7) shown in FIG. 8, is transferred through the programmable delay line (30)shown in FIG. 10 at the output of which its transitions phase (timing) is compared with the transition timing of the high-speed clock (9) using the phase detector (31). The output of the phase detector (31) is transferred via a low-pass filter (32) in order to eliminate any short term glitches, and controls the up/down counter (33). The programmable delay is adjusted to delay the incoming data stream such that transitions of the data stream will lineup with the trailing edge of the high-speed clock. The counter (33) and the phase detector (31) are set to work together to perform this kind of adjustment in the phase synchronization circuit (10). This type of circuit is collectively known to those skilled in the art of Analog and Digital circuit design as Delay Locked Loop or DLL.

Figure 9:
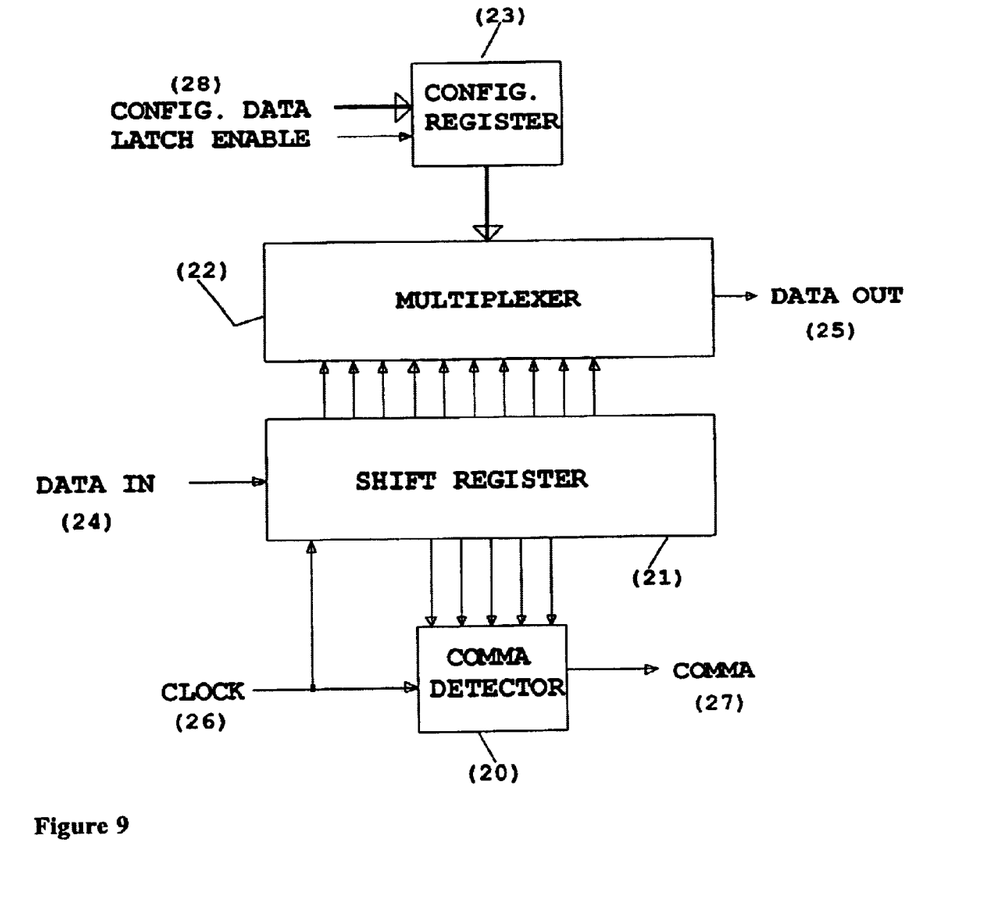
FIG. 9 is a detailed block diagram of a bit synchronizer.
Figure 12:
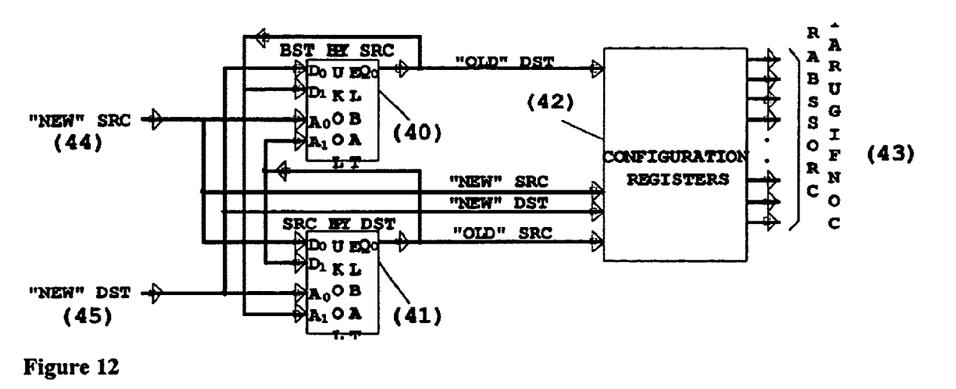
FIG. 12 is a detailed block diagram of a routing controller which takes care of the cross switching.

Next, data processed and synchronized by the phase synchronizer (10) enters the bit synchronizer (11). The purpose of this circuit is to align the bit patterns of all the various inputs to an internal reference signal. The data stream is composed of a string of predefined bit patterns. Certain patterns are assigned to normal data messages, while other are dedicated to idle and signaling streams. The latter patterns typically include special alignment patterns, sometimes known as COMMAs. The bit synchronization circuit (11) searches for these patterns and uses them to align the data bits. FIG. 9 shows the details of the bit synchronization circuit (11), and its associated bit control (14). Serial data (24) is passed through a shift register (21) while the comma detector (20) compares the data in the shift register (21) and the specific comma pattern. The time position of the comma with regards to an internal clock (26) is determined and is used to generate the configuration data (28), which is loaded into the configuration register (23). The configuration register (23) controls a multiplexer (22) which is used to select outputs of different stages of the shift register (21). The output data (25) can thus be shifted in time, at the high-speed clock intervals resolution, in order to properly time this data with regards to the reference clock The crossbar configuration controller (15) detailed block diagram is shown in FIG. 12. The Destination by Source lookup table (40) contains the routing information whereas the output to which a given input is connected is listed. The Source by Destination lookup table (41) contains the routing information whereas the input to which a given output is connected is listed. The controller uses these lookup tables in conjunction with the requested "new" source data (44), and the requested new destination data (45) to determine the new route and the changes required in the existing configuration. Once this is determined the controller instructs the configuration register (42), and updates the lookup tables (40) and (41) respectively, with the new routing configuration information (43).

We claim:

1. A programmable digital signal routing apparatus comprising:
   a programmable switching matrix configured to route any of a set of P inputs to any of a set of Q outputs;
   a set of flip-flops corresponding to each of said Q outputs;
   a master clock coupled to said set of flip-flops to synchronously provide a synchronous
   clock signal to each of said flip-flops; and
   a set of variable delay circuits corresponding to, and disposed in front of each of a corresponding one of said flip-flops, each one of said variable delay circuits including two sections wherein
      a first section controls first delay increments to synchronize data signal transitions to the master clock, and
      a second section provides second programmable delay increments to synchronize the data input to said routing apparatus.

2. An apparatus as in claim 1 wherein said second delay increments are larger than said first delay increments.

3. An apparatus as in claim 1 wherein for each of P inputs, the variable delay circuit is disposed between the P inputs and the programmable switching matrix.

4. An apparatus as in claim 2 wherein the smaller delay increments are obtained by a digitally programmable delay line and control signals are derived from one of a dynamic control circuit and a lookup table.

5. A programmable digital signal routing apparatus comprising:
   a programmable switching matrix configured to route any of a set of P inputs to any of a set of Q outputs;
   a set of flip-flops corresponding to each of said Q outputs;
   a set of variable delay circuits corresponding to, and disposed in front of each of a corresponding one of said flip-flops; and
   a master clock coupled to said set of flip-flops to synchronously provide a synchronous clock signal to each of said flip-flops;
   wherein for each of said Q outputs, the variable delay circuit is disposed between the programmable switching matrix and the flip-flops.

6. An apparatus as in claim 5 wherein a flip-flop corresponding to each of the P inputs is disposed between the variable delay circuit and the programmable switching matrix, and wherein the flip-flops are synchronously clocked by a master clock.

7. An apparatus as in claim 5 wherein the programmable switching matrix is implemented as a crossbar type matrix, and wherein a plurality of multiplexers each combined with a flip-flop to form the switching matrix and wherein all flip-flops are clocked by the master clock.

8. A programmable digital signal routing apparatus comprising:
   a programmable switching matrix configured to route any of a set of P inputs to any of a set of Q outputs;
   a set of flip-flops corresponding to each of said Q outputs; and
   a master clock coupled to said set of flip-flops to synchronously provide a synchronous clock signal to each of said flip-flops;
   wherein at least two routing operations are executed simultaneously in a make before break fashion such that signal flow to the outputs of the apparatus is not interrupted "executing said routing operations; and wherein for each of the Q outputs, a variable delay circuit is disposed between the programmable switching matrix and a respective one of the flip-flops."

9. An apparatus as in claim 8 wherein an integral control circuitry includes two lookup tables wherein one is organized as a Destination By Source table and the other as a Source By Destination table and wherein the data stored in those two tables is used to facilitate interchange of connections between any two inputs and any two outputs.

* * * * *